United States Patent [19]

Louzos

[11] 4,314,010

[45] Feb. 2, 1982

[54] SOLID STATE CELL EMPLOYING AN ELECTRON DONOR-EMBEDDED ANODE

[75] Inventor: Demetrios V. Louzos, Rocky River, Ohio

[73] Assignee: Union Carbide Corporation, New York, N.Y.

[21] Appl. No.: 192,003

[22] Filed: Sep. 29, 1980

[51] Int. Cl.³ ............................................. H01M 4/60
[52] U.S. Cl. ................................... 429/191; 429/213
[58] Field of Search ................................ 429/213, 191

[56] References Cited

U.S. PATENT DOCUMENTS

| | | | |
|---|---|---|---|
| 3,660,163 | 5/1972 | Moser | 136/83 R |
| 3,660,164 | 5/1972 | Hermann et al. | 136/83 R |
| 3,713,897 | 1/1973 | Liang | 136/153 |
| 4,049,890 | 9/1977 | Schneider | 429/181 |
| 4,148,976 | 4/1979 | Sekido et al. | 429/191 |
| 4,182,798 | 1/1980 | Skarsted | 429/213 |

*Primary Examiner*—Donald L. Walton
*Attorney, Agent, or Firm*—Cornelius F. O'Brien

[57] ABSTRACT

A solid state cell employing a charge transfer complex cathode along with an anode such as lithium having embedded particles of an electron donor so as to effectively increase the anode/cathode interfacial area.

10 Claims, No Drawings

SOLID STATE CELL EMPLOYING AN ELECTRON DONOR-EMBEDDED ANODE

FIELD OF THE INVENTION

The invention relates to a solid state cell, employing a charge transfer complex cathode in which particles of an electron donor, i.e. poly-2-vinylpyridine, are at least partially embedded into the anode of the cell so as to effectively increase the anode/cathode interfacial area.

BACKGROUND OF THE INVENTION

Ionic conductivity is usually associated with the flow of ions through an aqueous solution of metallic salts. In the vast majority of practical uses of ionic conductors, e.g., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have ionic conductances approaching those exhibited by the commonly used liquid systems. Such compounds have specific conductances at room temperature (20° C.) in the range of $10^{-6}$ to $10^{-15}$ ohm$^{-1}$ cm$^{-1}$ as compared to aqueous solutions of salts which typically have a specific conductance of 0.5 to 0.05 ohm$^{-1}$ cm$^{-1}$.

Improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid electrolyte power sources.

Gutman et al. J. Electrochem. Soc., 114, 323 (1967) discloses solid state cells utilizing cathodes of electronically conducting charge transfer complexes and anodes of selected divalent metals. U.S. Pat. No. 3,660,163 discloses solid state lithium-iodine primary cells employing a lithium anode, a solid state lithium halide electrolyte and a conductive cathode of organic materials, such as polycyclic aromatic compounds, organic polymers, heterocyclic nitrogen-containing compounds, and the like, and iodine. U.S. Pat. No. 3,660,164 discloses solid state cells utilizing as a cathode a charge transfer complex in which the acceptor component is the halogen and the donor component is an organic compound, typically aromatic or heterocyclic.

Although various solid state cells employing charge transfer complex cathodes have been recited in the art, it has been observed that during discharge the current and voltage drop relatively early thus limiting their use in some applications. It is therefore an object of the present invention to provide a solid state cell in which the current and voltage remain relatively high during discharge.

Another object of the present invention is to provide a solid state cell employing a cathode comprising a charge transfer complex in which particles of an electron donor are at least partially embedded into the cell's anode.

Another object of the present invention is to provide a solid state cell employing a charge transfer complex and in which the anode/cathode interfacial area is effectively increased by embedding particles of an electron donor of a charge transfer complex into the anode.

The foregoing and additional objects will become more fully apparent from the following description.

SUMMARY OF THE INVENTION

The invention relates to a solid state cell comprising an anode, a solid electrolyte and a charge transfer complex cathode in which the complex is the reaction product of a first electron donor and an electron acceptor; the improvement wherein a minor amount of a second electron donor in particulate form is at least partially embedded in the anode and said second electron donor being at least partially exposed to the electron acceptor so that it effectively provides a network extension of a complex cathode into the anode having an electrolyte interface therebetween. An extended network shall mean a substantial interconnected structure of a donor.x acceptor complex which is directly or indirectly electronically connected to the cathodic terminal of the cell.

As used herein, a minor amount shall mean less than 50 percent by weight of the anode. Preferably, the electron donor should be embedded into the anode in an amount between about 5% and about 30% by weight of the anode and more preferably between about 10% and about 15%.

Charge transfer complexes are well-known class of materials that have two components—one as an electron donor, the other as an electron acceptor—which form weakly bonded complexes that exhibit electronic conductivity higher than either component. High energy density solid state cell systems have been favorably received for use in various applications, such as the heart pacer batteries, requiring low discharge currents. However, in devices requiring higher current power sources, the solid state charge transfer complex cell systems have sometimes proved to be inadequate. It is believed that this is due to the forming of a high resistance layer at the cathode-anode interface by the discharge product of the cell. For example, in a lithium/iodine solid state cell a high resistance layer of LiI is believed to be formed during discharge which effectively increases the cell's resistance and lowers the cell's discharge rate capability. To overcome this negative characteristic, the present invention is directed to the embedding of a minor amount of an electron donor at least partially into the anode such that the electron donor is substantially electronically exposed to the electron acceptor of the cell's cathode so that it effectively provides a network extension of a cathode into the anode. This is believed to accomplish two purposes, the first of which is that it radically increases the interfacial area between the anode and cathode thereby permitting higher currents to be obtained. The second purpose is that it provides a highly irregular interconnected matrix in the anode that is electronically connected to the cathodic terminal of the cell, thereby extending the area of formation of the cell's discharge product, e.g. LiI. This effectively prevents early cell discharge demise due to the formation of a plane of the discharge product, LiI, which is a highly resistant material. It has been observed that the reaction depth, that is, the penetration of the discharge product into the anode, can be greatly increased using the teachings of this invention. By increasing the reaction depth for the cell during its functional mode, a continuous high current and voltage output can be obtained.

The amount of the electron donor to be embedded into the anode can vary between about 5% and about 30% by weight and preferably between about 10% and about 15%. An amount above 30% by weight of the anode might provide a cathode overbalance in the cell. An amount below 5% by weight may not effectively increase the current and voltage output. It is within the scope of this invention to embed particles of the total charge transfer complex cathode to provide an interconnected matrix of the cathode in the anode and still achieve the benefits of this invention. The electron donor to be embedded in the anode could be the same electron donor forming the charge transfer complex cathode or it could be a different electron donor. Suitable electron donors for use in this invention are poly-2-vinylpyridine (P2-VP), mesophase pitch, poly(N-vinylpyrrolidone), anthracene, naphthalene and other heterocyclic and polynuclear aromatic entities.

A detailed description for producing mesophase pitch can be found in U.S. Pat. Nos. 4,005,183 4,017,327 and 4,026,788, and U.S. application Ser. No. 833,963 filed on Oct. 3, 1977 in the name of Stephen Chivastick. Mesophase pitch for use in solid state cell systems is disclosed in U.S. application Ser. No. 052,846 filed June 28, 1979 now U.S. Pat. No. 4,243,732. All of these references are incorporated herein by reference.

Suitable electron acceptors for this invention would be a halogen such as iodine, bromine or chlorine, a mixture of two or more halogens or a compound (interhalogen) of two or more halogens.

Preferably the acceptor component such as iodine or bromine should range between about 50 percent to about 97 percent by weight of the total charge transfer complex and most preferably between about 80 percent and 90 percent by weight.

Anode materials suitable for use with the cathodes of this invention include lithium, silver, sodium, potassium, rubidium, magnesium and calcium. The preferred anode material is lithium.

Solid electrolytes for use in this invention would include lithium iodide, silver iodide, silver bromide, lithium bromide, tetrasilver ribidium pentaiodide, lithium aluminum tetrachloride, tetrasilver potassium tetraiodide cyanide, tetrasilver rubidium tetraiodide cyanide, sodium iodide and sodium bromide. The preferred solid electrolytes for use in this invention are lithium iodide and tetrasilver potassium tetraiodide cyanide.

As disclosed in U.S. Pat. No. 3,660,163, in lithium anode cell, lithium iodide can be formed in situ by contacting the lithium anode with the iodine-containing cathode surface whereupon the lithium will react with the iodine in the cathode to form a lithium iodide electrolyte layer that will contact both the anode and the cathode. Alternately, the lithium iodide could be formed by reacting lithium and iodine and then applying the lithium iodide as a coating on the surface of the anode or cathode.

Preferable cell systems using the cathode of this invention would be as follows:

| Cathode | Anode | Electrolyte |
|---|---|---|
| Poly-2-Vinyl-pyridine . iodine complex | lithium | lithium iodide |
| Poly-2-Vinyl-pyridine . bromide complex | lithium | lithium bromide |

The particulate electron donor could be embedded by simply rolling the metal anode using a conventional rolling mill while the particles of the donor are fed on top of the anode at a preselected rate. This technique is ideally suited for continuously producing the anodes of this invention on a large scale production run. If desired, the particulate electron donor could by physically mixed with the anode material, followed by compression of the mixture to form an anode having embedded particles of the electron donor. Where there is a possibility that the electron donor may extend through the anode material and be disposed such that it could short out the cell which could occur after the donor particles are converted to an active cathodic material, then a layer of the anode without the embedded donor particles may be required to be placed between the anode and the anode collector.

EXAMPLE

Each of several 0.457-inch diameter button cells was constructed as follows. A mesophase pitch/iodine charge transfer complex was prepared by grinding the mesophase pitch and iodine components followed by drying them using phosphorus pentoxide for a week in an argon dry box. Thereafter, the mesophase pitch and iodine were blended together in a weight ratio of one mesophase pitch to 18 iodine(mesophase.95% iodine) and then sealed in an evacuated tube whereupon it was heated at 200° C. for 16 hours. The resulting charge transfer complex was assembled in a nickel-plated cold-rolled steel container.

A lithium anode strip consisting of 0.015 inch thick lithium was embedded with 0.0015 gram of a particulate electron donor. Two of each type sample calls were produced using the particulate electron donor as shown in Table 1. The particulate electron donor was forced onto the lithium strip until the particles broke through the strip and appeared on the opposite side of the strip. Consequently, before placing the anode in the cover of the cell, a second layer of lithium(same weight and thickness but without the donor particles) was placed between the donor-embedded anode and the anode collector cover to prevent any possible internal shorting that could occur after the donor particles are converted to donor.$xI_2$ particles by the iodine vapor transport which occurs in the cell.

The cover containing the anode was then assembled along with a gasket on top of the container in a conventional manner such that the surface of the anode made contact with the surface of the cathode. The donor particles, upon contact with the iodine, formed a donor.$xI_2$ complex, thereby providing an interconnected matrix of a cathode within the anode. This effectively extended the cathode within the anode, providing an increased interfacial area between the anode and the cathode. The electrolyte, lithium iodide, was also formed in situ by the reaction of the lithium in the anode and the iodine in the cathode. Two cells of each type were then continuously discharged across various resistive loads and the voltages along with the impedance observed were recorded and are shown in Table II through VIII.

TABLE I

| Sample Cells | Electron Donor Embedded in Anode | Load (Ohm × 10³) |
|---|---|---|
| A & A¹ | none | 200 |
| B & B¹ | poly-2-vinylpyridine | 100 |
| C & C¹ | poly(N-vinylpyrolidone)* | 200 |
| D & D¹ | poly(N-vinylpyrrolidone)** | 200 |
| E & E¹ | mesophase pitch | 200 |
| F & F¹ | polystyrene*** | 200 |
| G & G¹ | alumina*** | 200/100 |

*molecular weight of 10,000 approximately
**molecular weight of 40,000 approximately
***not electron donors

TABLE II

| | Cell Sample A* | | Cell Sample A¹* | |
|---|---|---|---|---|
| Time (days) | Voltage (volts) | Impedance (ohms × 10³) | Voltage (volts) | Impedance (ohms × 10³) |
| 0 | 2.78 | 0.5 | 2.78 | 0.5 |
| 200 | 2.60 | 9.0 | 2.62 | 8.0 |
| 400 | 2.52 | 13.5 | 2.54 | 11.8 |
| 600 | 2.45 | 20.5 | 2.50 | 18.5 |
| 800 | 2.38 | 23.0 | 2.45 | 22.0 |
| 1000 | 2.30 | 28.0 | 2.35 | 27.5 |
| 1200 | 2.15 | 40.8 | 2.20 | 35.0 |
| 1400 | 2.10 | 50.0 | 2.08 | 48.0 |

*no additive in the anode

TABLE III

| | Cell Sample B | | Cell Sample B¹ | |
|---|---|---|---|---|
| Time (hours) | Voltage (volts) | Impedance (ohms × 10³) | Voltage (volts) | Impedance (ohms × 10³) |
| 0 | 2.78 | 0.5 | 2.78 | 0.5 |
| 200 | 2.76 | 0.5 | 2.76 | 0.5 |
| 400 | 2.75 | 0.5 | 2.75 | 0.5 |
| 600 | 2.72 | 1.0 | 2.68 | 2.5 |
| 960 | 2.50 | 7.5 | 2.04 | 28.0 |

TABLE IV

| | Cell Sample C | | Cell Sample C¹ | |
|---|---|---|---|---|
| Time (hours) | Voltage (volts) | Impedance (ohms × 10³) | Voltage (volts) | Impedance (ohms × 10³) |
| 0 | 2.81 | 1.0 | 2.81 | 1.0 |
| 200 | 2.7 | 2.0 | 2.7 | 2.0 |
| 400 | 2.65 | 5.0 | 2.65 | 5.0 |
| 600 | 2.62 | 11.0 | 2.60 | 11.0 |

TABLE V

| | Cell Sample D | | Cell Sample D¹ | |
|---|---|---|---|---|
| Time (hours) | Voltage (volts) | Impedance (ohms × 10³) | Voltage (volts) | Impedance (ohms × 10³) |
| 0 | 2.72 | 3.0 | 2.74 | 1.5 |
| 200 | 2.71 | 2.0 | 2.70 | 3.0 |
| 400 | 2.68 | 5.0 | 2.68 | 7.0 |
| 600 | 2.65 | 6.0 | 2.65 | 8.0 |
| 1000 | 2.58 | 12.0 | 2.58 | 13.0 |
| 1400 | 2.40 | 22.0 | 2.40 | 25.0 |
| 1700 | 2.25 | 37.0 | 2.20 | 41.0 |

TABLE VI

| | Cell Sample E | | Cell Sample E¹ | |
|---|---|---|---|---|
| Time (hours) | Voltage (volts) | Impedance (ohms × 10³) | Voltage (volts) | Impedance (ohms × 10³) |
| 0 | 2.78 | 2.0 | 2.78 | 2.0 |
| 200 | 2.67 | 4.0 | 2.61 | 5.0 |
| 600 | 2.58 | 7.0 | 2.50 | 8.0 |
| 1000 | 2.45 | 18.0 | 2.42 | 19.0 |
| 1400 | 2.2 | 31.0 | 2.1 | 36.0 |
| 1630 | 2.08 | 45.0 | 2.08 | 45.0 |

TABLE VII

| | Cell Sample F | | Cell Sample F¹ | |
|---|---|---|---|---|
| Time (hours) | Voltage (volts) | Impedance (ohms × 10³) | Voltage (volts) | Impedance (ohms × 10³) |
| 200 | 2.6 | 10 | 2.55 | 12 |
| 600 | 2.33 | 31 | | |

TABLE VIII

| | Cell Sample G* | | Cell Sample G¹** | |
|---|---|---|---|---|
| Time (hours) | Voltage (volts) | Impedance (ohms × 10³) | Voltage (volts) | Impedance (ohms × 10³) |
| 0 | 2.78 | 1.0 | 2.78 | 1.0 |
| 840 | | | 1.68 | 33.5 |

*resistive load = 200 K ohms
**resistive load = 100 K ohms

As evident from the data shown in Tables I through VIII the cells employing the teachings of this invention exhibited higher voltages and lower resistance for a longer period of time during discharge over the cells of the prior art (Sample A & A¹) and cells employing particles embedded in the anode which were not electron donors (Sample F,F¹, G and G¹).

It should be understood that the foregoing disclosures relates to preferred embodiments of the invention and it is intended to cover all changes and modifications of the invention which do not depart from the spirit and scope of the appended claims.

What is claimed is:

1. A solid state cell comprising an anode, a solid electrolyte and a charge transfer complex cathode in which the complex is the reaction product of a first electron donor and an electron acceptor; the improvement wherein a minor amount of a second electron donor in particulate form is at least partially embedded in the anode and said second electron donor being at least partially exposed to the electron acceptor so that it effectively provides a network extension of a complex cathode into the anode.

2. The solid state cell of claim 1 wherein the second electron donor at least partially embedded in the anode is present in an amount between about 5% and about 30% by weight of the anode.

3. The solid state cell of claim 2 wherein the second electron donor at least partially embedded in the anode is present in an amount between about 10% and about 15% by weight of the anode.

4. The solid state cell of claim 1 wherein the second electron donor is the same as the first electron donor.

5. The solid state cell of claim 1 wherein the charge transfer complex cathode in particulate form provides the second electron donor.

6. The solid state cell of claim 1,3,4, or 5 wherein the electron acceptor is at least one halogen; the first electron donor and the second electron donor are selected from the group consisting of poly-2-vinylpyridine, mesophase pitch, poly(N-vinylpyrrolidone), anthracene and naphthalene; the solid electrolyte is selected from the group consisting of lithium iodide and lithium bromide; and the anode is selected from the group consisting of lithium, sodium, potassium, rubidium, magnesium and calcium.

7. The solid state cell of claim 1,3,4 or 5 wherein the electron acceptor is iodine or bromine; the first electron donor is mesophase pitch, poly-2-vinylpyridine or poly(N-vinylpyrrolidone); the solid electrolyte is lithium iodide or lithium bromide; and anode is lithium and the second electron donor is poly-2-vinylpyridine, mesophase pitch or poly(N-vinylpyrrolidone).

8. The solid state cell of claim 1,3,4 or 5 wherein the electron acceptor is iodine; the first electron donor is poly-2-vinylpyridine; the solid electrolyte is lithium iodide; the anode is lithium and the second electron donor is poly(N-vinylpyrrolidone).

9. The solid state cell of claim 1,3,4 or 5 wherein the electron acceptor is iodine; the first electron donor is poly-2-vinylpyridine; the solid electrolyte is lithium iodide; the anode is lithium and the second electron donor is mesophase pitch.

10. The solid state cell of claim 1,3,4 or 5 wherein the electron acceptor is iodine; the first electron donor is poly-2-vinylpyridine; the solid electrolyte is lithium iodide; the anode is lithium and the second electron donor is poly-2-vinylpyridine.

* * * * *

UNITED STATES PATENT AND TRADEMARK OFFICE
CERTIFICATE OF CORRECTION

PATENT NO. : 4,314,010
DATED : February 2, 1982
INVENTOR(S) : Demetrios V. Louzos It is certified that error appears in the above—identified patent and that said Letters Patent is hereby corrected as shown below:

Column 7, line 11, delete the word "and", first occurrence, and add -- the --.

Signed and Sealed this

Twenty-second Day of June 1982

[SEAL]

Attest:

*Attesting Officer*

GERALD J. MOSSINGHOFF

*Commissioner of Patents and Trademarks*